US008960226B2

(12) United States Patent
Grochowski

(10) Patent No.: US 8,960,226 B2
(45) Date of Patent: Feb. 24, 2015

(54) TRANSMISSION HYDRAULIC CONTROL SYSTEM HAVING FLUID BYPASS SLEEVE

(75) Inventor: Edwin T. Grochowski, Howell, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 600 days.

(21) Appl. No.: 13/312,451

(22) Filed: Dec. 6, 2011

(65) Prior Publication Data

US 2012/0174998 A1    Jul. 12, 2012

Related U.S. Application Data

(60) Provisional application No. 61/432,144, filed on Jan. 12, 2011.

(51) Int. Cl.
*F03B 11/02* (2006.01)
*F16D 48/02* (2006.01)
*F16H 61/00* (2006.01)

(52) U.S. Cl.
CPC ............ *F16D 48/02* (2013.01); *F16H 61/0009* (2013.01); *F16H 61/0021* (2013.01); *F16D 2048/0221* (2013.01); *F16D 2048/0233* (2013.01); *F16D 2048/0281* (2013.01)
USPC .................................... 137/561 R; 192/85.63

(58) Field of Classification Search
CPC ................... F16D 48/0206; F16D 2048/0221; F16B 13/0402; F16H 61/0021
USPC ...... 137/561 R, 594, 625.65, 625.66, 625.69; 192/85.63
See application file for complete search history.

(56) References Cited

U.S. PATENT DOCUMENTS

| 4,243,062 A * | 1/1981 | Shelton ........................ 137/62 |
| 2007/0131291 A1* | 6/2007 | Lee ........................ 137/625.69 |
| 2008/0258090 A1* | 10/2008 | Najmolhoda et al. ... 251/129.15 |
| 2010/0190606 A1* | 7/2010 | Moses et al. .................. 477/168 |
| 2010/0243941 A1* | 9/2010 | Drumm et al. ................ 251/321 |
| 2010/0263426 A1* | 10/2010 | Maguire et al. .............. 72/253.1 |
| 2010/0313980 A1* | 12/2010 | Shimizu et al. .......... 137/625.64 |

FOREIGN PATENT DOCUMENTS

| CN | 1936370 A | 3/2007 |
| CN | 101788054 A | 7/2010 |

* cited by examiner

*Primary Examiner* — John Rivell
*Assistant Examiner* — Reinaldo Sanchez-Medina

(57) ABSTRACT

A hydraulic control system for a clutch of a transmission includes a source of pressurized hydraulic fluid, a line pressure regulator valve, a clutch control valve, a control valve bore, and a bypass sleeve. The bypass sleeve is installed in the control valve bore and includes an axial bore, and a first and a second port. The first port is in communication with the axial bore and the first of the plurality of ports of the control valve bore, the second port is in communication with the axial bore and the second of the plurality of ports of the control valve bore, and the axial bore is not in communication with the remainder of the plurality of ports of the control valve bore.

9 Claims, 3 Drawing Sheets

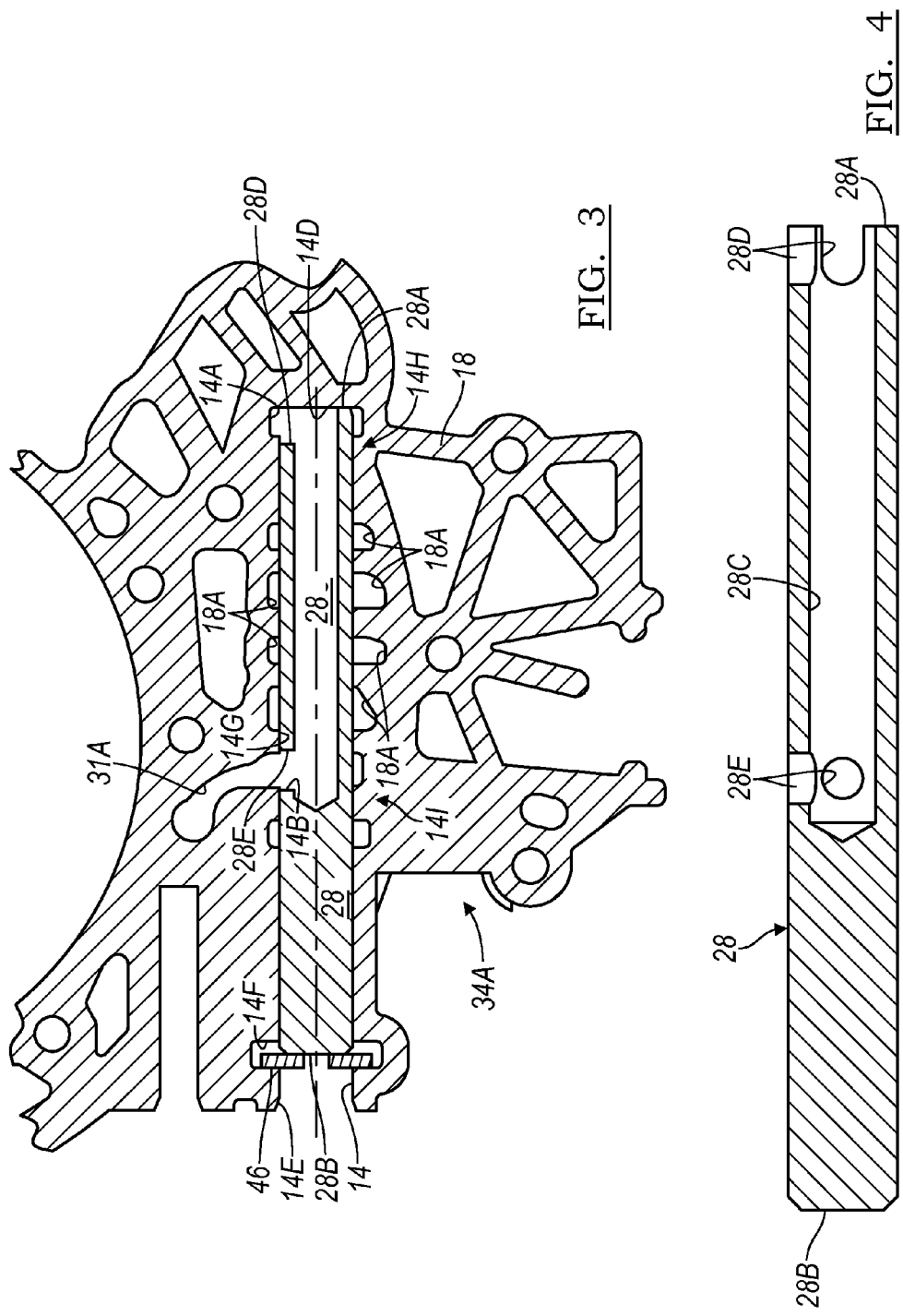

TRANSMISSION HYDRAULIC CONTROL SYSTEM HAVING FLUID BYPASS SLEEVE

CROSS-REFERENCE TO RELATED APPLICATIONS

This application claims the benefit of U.S. Provisional Application No. 61/432,144 filed on Jan. 12, 2011. The disclosure of the above application is incorporated herein by reference.

FIELD

The present disclosure relates to a hydraulic pump and valve body assembly, and more particularly to a transmission hydraulic pump and valve body assembly having multiple valves, ports and passages for regulating fluid flow to multiple actuators.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine or electric motor of the motor vehicle. An auxiliary pump may also be provided powered by a secondary prime mover, such as an electric engine, to provide fluid flow when the prime mover, and therefore the main pump, is turned off such as during stop-start engine control strategies. The valves and solenoids supplied with the hydraulic fluid are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain a torque path from the engine to the transmission output member.

Some pressurized fluid systems may be required to operate multiple transmission systems using the same basic hardware assemblies such as pumps, pump bodies and valve bodies, for example. When adapting common hardware to new or different hydraulic fluid systems, some individual parts may be substituted with new parts to save on complexity and money. Previously, a unique pressurized fluid system was required for each transmission application. Unique pressurized fluid systems while performing well for their application require immense amounts of investment and design work and causes additional complexity within the manufacturing process. Additional parts and manufacturing steps also increase the cost of the system while decreasing its reliability. While these fluid systems are effective, there is room in the art for an apparatus for adapting a single hydraulic fluid system to multiple transmission applications.

SUMMARY

A hydraulic control system for a clutch of a transmission is provided according to the principles of the present invention. The hydraulic control system includes a source of pressurized hydraulic fluid, a line pressure regulator valve, a clutch control valve, a control valve bore, and a bypass sleeve. The line pressure regulator valve has an input port, an output port, and a valve spool. The input port is in communication with the source of pressurized hydraulic fluid. The valve spool is biased to provide regulated pressure from the input port to the output port. The clutch control valve has a solenoid, a valve spool, an input port and a first output port. The input port is in communication with the source of pressurized hydraulic fluid. The control valve bore has a plurality of ports. A first of the plurality of ports is in communication with the first output port of the clutch control valve. A second of the plurality of ports is in communication with the clutch. The bypass sleeve is disposed in the control valve bore. The bypass sleeve has an axial bore, and a first and a second port. The first port is in communication with the axial bore and the first of the plurality of ports of the control valve bore. The second port is in communication with the axial bore and the second of the plurality of ports of the control valve bore. The axial bore is not in communication with the remainder of the plurality of ports of the control valve bore.

In another example of the present invention, the hydraulic control system includes a retention ring. The control valve bore further includes a groove disposed proximate an open end of the control valve bore. The retention ring is disposed in the groove of the control valve bore and is in contact with the bypass sleeve.

In yet another example of the present invention, the bypass sleeve further has a first end and a second end opposite the first end. The axial bore extends from the second end to approximately midway between the second end and the first end.

In yet another example of the present invention, the second end of the bypass sleeve is an open end, the first port is proximate the second end, and the second port is disposed midway between the second end and the first end of the bypass sleeve.

In yet another example of the present invention, the bypass sleeve includes a third and fourth ports. The third port is in communication with the axial bore and the first port of the control valve bore, and the fourth port is in communication with the axial bore and the second port of the control valve bore.

Further features and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

FIG. 3 is a portion of a cross-section of an exemplary pump body assembly installed with the fluid bypass sleeve according to the present disclosure; and FIG. 4 is a perspective view of the cross-section of an exemplary fluid bypass sleeve of the valve body assembly according to the present disclosure.

DETAILED DESCRIPTION

The following description is merely exemplary in nature and is not intended to limit the present disclosure, application, or uses.

Figure 1:
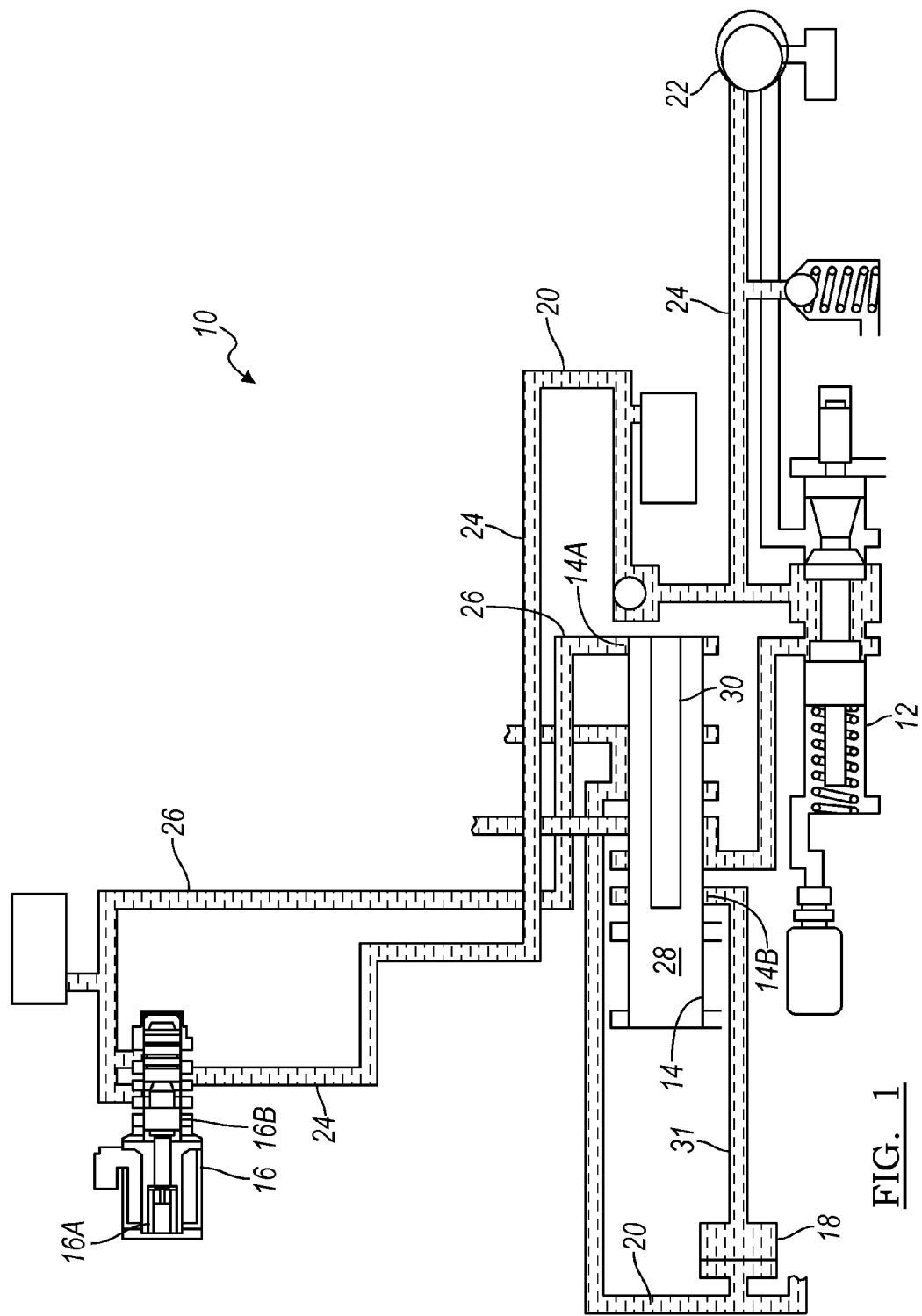
FIG. 1 is a schematic of a hydraulic control circuit according the present disclosure.

Referring to the drawings, wherein like reference numbers refer to like components, in FIG. 1 a schematic of an exemplary embodiment of a hydraulic control system 10 is illustrated. The hydraulic control system 10 includes a line pressure regulator valve 12, a control valve bore 14, and a clutch control valve 16 according to the principles of the present invention that are operable to control an engine disengage clutch 18 using pressurized hydraulic fluid 20. For example, the hydraulic control system 10 includes a pressurized hydraulic fluid source 22, such as a pump, accumulator, or intermediary hydraulic controls that communicates the pressurized hydraulic fluid 20 to the clutch control valve 16 via a first pressurized fluid pathway 24. The clutch control valve 16 includes a solenoid 16A and valve spool 16B and selectively communicates the pressurized hydraulic fluid 20 to the control valve bore 14 through a second pressurized fluid pathway 26. The control valve bore 14 includes a fluid bypass sleeve 28, a first inlet port 14A that communicates with the second fluid pathway 24 and a first outlet port 14B that communicates with the engine disengage clutch 18. The fluid bypass sleeve 28 forms a third pressurized fluid pathway 30 that communicates with the first inlet port 14A and the first outlet port 14B of the control valve bore 14. The first outlet port 14B communicates with engine disengage clutch 18 through a fourth pressurized fluid pathway 31.

Figure 2:
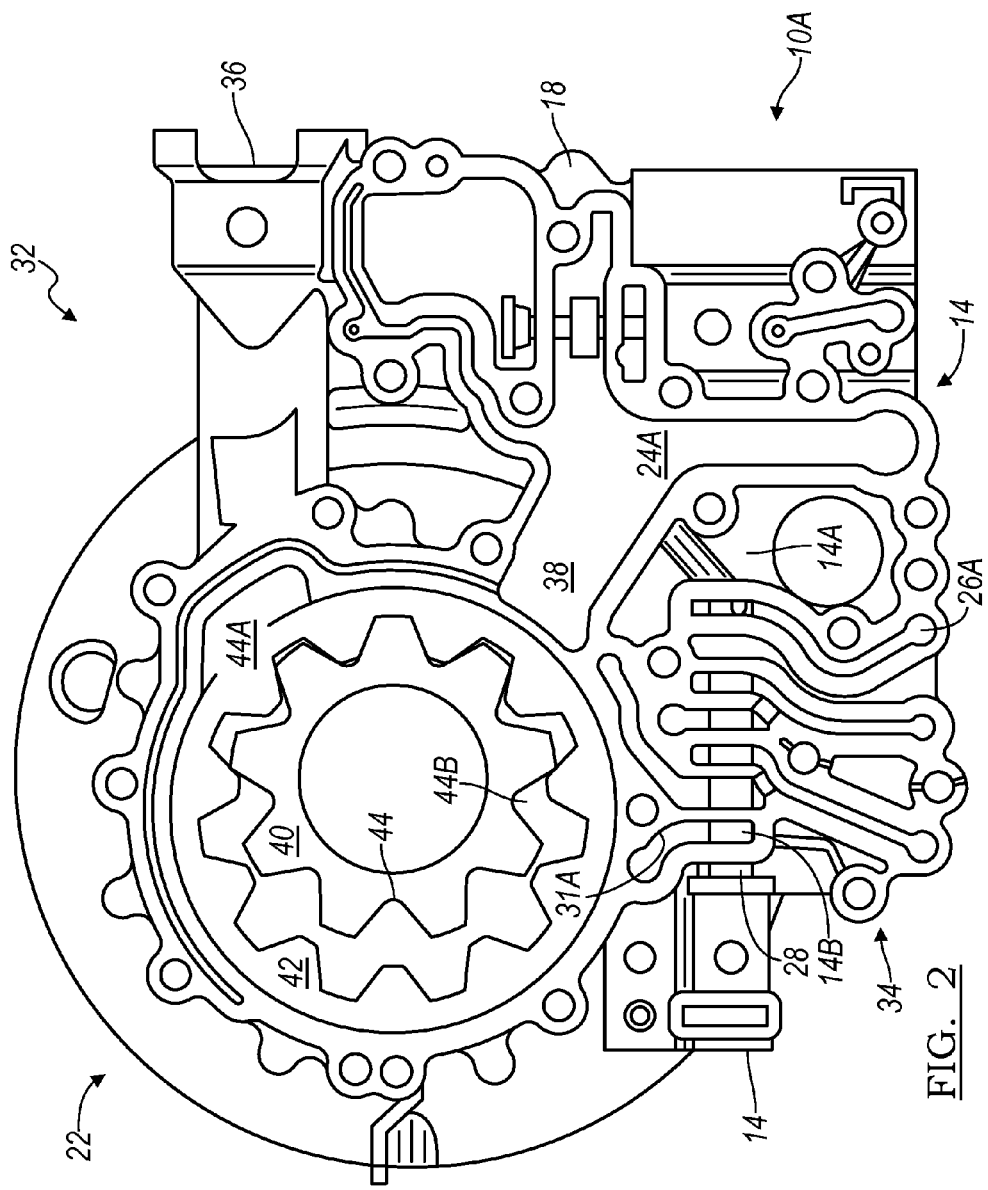
FIG. 2 is an end view of an exemplary hydraulic pump and pump body assembly according to the present disclosure.

Turning now to FIG. 2, a hydraulic pump body assembly 32 is shown including a portion 10A of the hydraulic control system 10 as described above. In FIGS. 2 and 3, reference numbers from like components in FIG. 1 are carried over. The hydraulic pump body assembly 32 includes a hydraulic fluid pump 22 and a pump body assembly 34. In this example, the hydraulic fluid pump 22 is a gerotor type fluid pump, however, the assembly may include other types of pumps without departing from the scope of this invention. The hydraulic fluid pump 22 includes an inlet port 36, an outlet port 38, an inner impeller 40, an outer impeller 42 and an interior cavity 44. The inlet port 36 is in communication with the sump (not shown) and a low pressure portion 44A of the interior cavity 44. The outlet port 38 is in communication with a high pressure portion 44B of the interior cavity 44.

The pump body 34 includes a first portion 24A of a first pressurized fluid pathway 24, a first portion 26A of a second pressurized fluid pathway 26, a control valve bore 14 and a first portion 31A of the fourth pressurized fluid pathway 31. The first portion 24A of the first pressurized fluid pathway 24 is in communication with the output port 38 of the hydraulic fluid pump 22 and the clutch control valve (not shown). The first portion 26A of the second pressurized fluid pathway 26 is in selective communication with the clutch control valve and a first inlet port 14A of the control valve bore 14. The control valve bore 14 also includes a first outlet port 14B and a third pressurized fluid pathway 30 (not shown) formed by a fluid bypass sleeve 28. The third pressurized fluid pathway 30 is in communication with the first inlet port 14A and the first outlet port 14B of the control valve bore 14. The fourth pressurized fluid pathway 31 is in communication with the outlet port 14A of the control valve bore 14 and an apply cavity of an engine disengage clutch (not shown).

Referring now to FIG. 3, a portion 34A of the pump body assembly 34 is illustrated. The portion 34A of the pump body assembly 34 includes a control valve bore 14, a fluid bypass sleeve 28, a retainer plate 46 and a portion 31A of a fourth pressurized fluid passageway 31. The control valve bore 14 includes a first inlet port 14A, a first outlet port 14B, an interior surface 14C, a first end 14D, a second end 14E, a retainer plate groove 14F and a plurality of other inlet and outlet ports 14G. The first inlet port 14A is disposed proximate the first end 14D and communicates with the second pressurized fluid pathway (not shown) and the interior surface 14C of the control valve bore 14. The first outlet port 14B is disposed proximate a midpoint 14H of the control valve bore 14 and communicates with the interior surface 14C of the control valve bore 14 and the fourth pressurized fluid pathway 31. The each of the plurality of other inlet and outlet ports 14G communicate with the interior surface 14C of the control valve bore 14 and one of a plurality of other fluid passageways 18A of the pump body 18.

The fluid bypass sleeve 28 includes a first end 28A, a second end 28B, a bore or interior passage 28C, at least one inlet port 28D and at least one outlet port 28E. The fluid bypass sleeve 28 is disposed in the control valve bore 14 so that the first end 28A of the fluid bypass sleeve 28 is adjacent the first end 14D of the control valve bore 14 and the second end 28B of the fluid bypass sleeve 28 is adjacent the second end 14E of the control valve bore 14. The first end 28A of the fluid bypass sleeve 28 may be open so that the bore 28C communicates with the interior surface 14G of the control valve bore 14. The second end 28B of the fluid bypass sleeve 28 is closed and the bore 28C may be disposed such that the bore 28C extends the full length of the fluid bypass sleeve 28 or it may be extended to fit the particular application to which it is employed. However, according to another example of the invention, the second end 28B of the fluid bypass sleeve 28 may be open. The inlet port 28D is disposed proximate the first end 28A of the fluid bypass sleeve 28 and communicates with an input portion 14H of the interior surface 14G of the control valve bore 14 and the bore 28C of the fluid bypass sleeve 28. The at least one outlet port 28E is disposed proximate a midpoint 28G of the fluid bypass sleeve, for example, and communicates with and output portion 14I of the interior surface 14G of the control valve bore 14 and the bore 28C of the fluid bypass sleeve 28. The retainer plate 46 is disposed in the retainer plate groove 14F and in contact with the second end 28B of the fluid bypass sleeve 28 to retain the fluid bypass sleeve 28 in the control valve bore 14. The outer surface of the fluid bypass sleeve 28 seals each of the plurality of other inlet and outlet ports 18A of the pump body 18 such that the other inlet and outlet ports 18A are no longer capable of communicating with the interior surface 14G of the control valve bore 14 effectively capping the ports 18A from communicating with each other.

Referring now to FIG. 4, a fluid bypass sleeve 28 is illustrated. The fluid bypass sleeve 28 includes a first end 28A, a second ends 28A, 28B, a bore 28C, at least one inlet port 28D and at least one outlet port 28E. The first end 28A of the fluid bypass sleeve 28 may be open. The second end 28B of the fluid bypass sleeve 28 is closed and the bore 28C may be disposed such that the bore 28C extends the full length of the fluid bypass sleeve 28 or it may be extended to fit the particular application to which it is employed. The at least one inlet port 28D is disposed proximate the first end 28A of the fluid bypass sleeve 28 and communicates with the bore 28C of the fluid bypass sleeve 28. The at least one outlet port 28E is disposed proximate a midpoint 28G of the fluid bypass sleeve, for example, and communicates with the bore 28C of the fluid bypass sleeve 28. There may be multiple inlet ports 28D or outlet ports 28E, for example, depending on the application of the fluid bypass sleeve 28.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A hydraulic control system for a clutch of a transmission, the hydraulic control system including:
a source of pressurized hydraulic fluid;
a line pressure regulator valve having an input port, an output port, and a valve spool, wherein the input port is in communication with the source of pressurized hydraulic fluid and the valve spool is biased to provide regulated pressure from the input port to the output port;
a clutch control valve having a solenoid, a valve spool, an input port and a first output port, wherein the input port is in communication with the source of pressurized hydraulic fluid;
a control valve bore having a plurality of ports and a groove, wherein a first of the plurality of ports is in communication with the first output port of the clutch control valve, a second of the plurality of ports is in communication with the clutch, and the groove is disposed proximate an open end of the control valve bore;
a bypass sleeve disposed in the control valve bore, the bypass sleeve having an axial bore, and a first and a second port, wherein the first port is in communication with the axial bore and the first of the plurality of ports of the control valve bore, the second port is in communication with the axial bore and the second of the plurality of ports of the control valve bore, and the axial bore is not in communication with the remainder of the plurality of ports of the control valve bore; and
a retention ring disposed in the groove of the control valve bore in contact with the bypass sleeve.

2. The hydraulic control system of claim 1 wherein the bypass sleeve further has a first end and a second end opposite the first end, wherein the axial bore extends from the second end to approximately midway between the second end and the first end.

3. The hydraulic control system of claim 2 wherein the second end of the bypass sleeve is an open end, the first port is proximate the second end, and the second port is disposed midway between the second end and the first end of the bypass sleeve.

4. The hydraulic control system of claim 1 wherein the bypass sleeve includes a third and fourth ports, wherein the third port is in communication with the axial bore and the first port of the control valve bore, and the fourth port is in communication with the axial bore and the second port of the control valve bore.

5. A hydraulic control system for a clutch of a transmission, the hydraulic control system including:
a source of pressurized hydraulic fluid;
a line pressure regulator valve having an input port, an output port, and a valve spool, wherein the input port is in communication with the source of pressurized hydraulic fluid and the valve spool is biased to provide regulated pressure from the input port to the output port;
a clutch control valve having a solenoid, a valve spool, an input port and a first output port, wherein the input port is in communication with the source of pressurized hydraulic fluid;
a control valve bore having a plurality of ports and a groove, wherein a first of the plurality of ports is in communication with the first output port of the clutch control valve, and a second of the plurality of ports is in communication with the clutch, and the groove is disposed proximate an open end of the control valve bore;
a retention ring disposed in the groove of the control valve bore; and
a bypass sleeve disposed in the control valve bore, the bypass sleeve having an axial bore, and a first and a second port, wherein the first port is in communication with the axial bore and the first of the plurality of ports of the control valve bore, the second port is in communication with the axial bore and the second of the plurality of ports of the control valve bore, and the axial bore is not in communication with the remainder of the plurality of ports of the control valve bore.

6. The hydraulic control system of claim 5 wherein the retention ring is in contact with the bypass sleeve.

7. The hydraulic control system of claim 6 wherein the bypass sleeve further has a first end and a second end opposite the first end, wherein the axial bore extends from the second end to approximately midway between the second end and the first end.

8. The hydraulic control system of claim 7 wherein the second end of the bypass sleeve is an open end, the first port is proximate the second end, and the second port is disposed midway between the second end and the first end of the bypass sleeve.

9. The hydraulic control system of claim 8 wherein the bypass sleeve includes a third and fourth ports, wherein the third port is in communication with the axial bore and the first port of the control valve bore, and the fourth port is in communication with the axial bore and the second port of the control valve bore.

* * * * *